(12) United States Patent
Achen et al.

(10) Patent No.: US 10,219,421 B2
(45) Date of Patent: *Mar. 5, 2019

(54) DOWN AND/OR UP FORCE ADJUSTMENT SYSTEM

(71) Applicant: Kinze Manufacturing, Inc., Williamsburg, IA (US)

(72) Inventors: Courtney N. Achen, Iowa City, IA (US); Marvin L. Bachman, Marengo, IA (US); Vaughan G. Stevenson, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,134

(22) Filed: Jun. 26, 2017

(65) Prior Publication Data

US 2017/0290259 A1    Oct. 12, 2017

Related U.S. Application Data

(63) Continuation of application No. 14/547,651, filed on Nov. 19, 2014, now Pat. No. 9,686,901, which is a
(Continued)

(51) Int. Cl.
*A01B 49/06* (2006.01)
*A01B 63/00* (2006.01)
(Continued)

(52) U.S. Cl.
CPC ............ *A01B 63/008* (2013.01); *A01B 49/04* (2013.01); *A01B 49/06* (2013.01); *A01B 71/02* (2013.01);
(Continued)

(58) Field of Classification Search
CPC ......... A01B 49/06; A01B 49/04; A01B 49/00; A01B 63/008; A01B 63/002; A01B 63/00;
(Continued)

(56) References Cited

U.S. PATENT DOCUMENTS 3,749,035 A    7/1973  Cayton et al.
4,085,862 A    4/1978  Steffen
(Continued)

FOREIGN PATENT DOCUMENTS

DE    8412142     5/1985
GB    2126062     3/1984

OTHER PUBLICATIONS

Kinze Manufacturing, Inc., PCT/US2012/035585, "International Search Report and Written Opinion", 9 pages, dated Jul. 10, 2012.
(Continued)

*Primary Examiner* — Christopher J. Novosad
(74) *Attorney, Agent, or Firm* — McKee, Voorhees & Sease, PLC (57) ABSTRACT

An agricultural device includes a number of row units that each includes a seed furrow opener that creates a furrow in the soil for seed placement. Each row unit is mounted to a toolbar of the device by a four-bar linkage which allows each row unit to move vertically to adjust to the contour of the soil independently of the other row units on the same toolbar. The four-bar linkages include one or more springs which work to transfer weight from the toolbar to the row unit. An actuator varies the tension in the spring thereby adjusting the down or up force applied to the row unit.

20 Claims, 5 Drawing Sheets

Related U.S. Application Data continuation of application No. 13/457,815, filed on Apr. 27, 2012, now Pat. No. 8,924,092.

(60) Provisional application No. 61/479,543, filed on Apr. 27, 2011, provisional application No. 61/479,537, filed on Apr. 27, 2011, provisional application No. 61/479,540, filed on Apr. 27, 2011.

(51) Int. Cl.
| | |
|---|---|
| *A01B 76/00* | (2006.01) |
| *A01B 71/02* | (2006.01) |
| *A01B 79/00* | (2006.01) |
| *A01C 5/06* | (2006.01) |
| *A01C 7/20* | (2006.01) |
| *A01C 21/00* | (2006.01) |
| *A01B 49/04* | (2006.01) |

(52) U.S. Cl.
CPC ............ *A01B 76/00* (2013.01); *A01B 79/005* (2013.01); *A01C 5/062* (2013.01); *A01C 5/064* (2013.01); *A01C 7/203* (2013.01); *A01C 7/205* (2013.01); *A01C 21/00* (2013.01); *Y10S 111/90* (2013.01); *Y10S 111/903* (2013.01)

(58) Field of Classification Search
CPC ....... A01B 76/00; A01B 71/02; A01B 79/005; A01C 5/064; A01C 5/062; A01C 5/06; A01C 5/00; A01C 7/203; A01C 7/205; A01C 21/00; Y10S 111/90; Y10S 111/903
See application file for complete search history.

(56) References Cited

U.S. PATENT DOCUMENTS

| | | | |
|---|---|---|---|
| 4,413,685 | A | 11/1983 | Gremelspacher et al. |
| 4,766,962 | A | 8/1988 | Frase |
| 5,529,128 | A | 6/1996 | Peterson et al. |
| 5,544,709 | A | 8/1996 | Lowe et al. |
| 5,563,340 | A | 10/1996 | Clowater et al. |
| 5,621,666 | A | 4/1997 | O'Neall et al. |
| 6,016,714 | A | 1/2000 | Smith et al. |
| 6,148,747 | A | 11/2000 | Deckler et al. |
| 6,216,794 | B1 | 4/2001 | Buchl |
| 6,389,999 | B1 | 5/2002 | Duello |
| 6,701,857 | B1 | 3/2004 | Jensen et al. |
| 7,025,009 | B2 | 4/2006 | Roibier |
| 7,316,189 | B2 | 1/2008 | Fountain et al. |
| 7,392,754 | B2 | 7/2008 | Flikkema et al. |
| 7,628,218 | B2 | 12/2009 | Cresswell |
| 7,726,251 | B1 | 6/2010 | Peterson et al. |
| 7,849,955 | B2 | 12/2010 | Crabill et al. |
| 8,078,367 | B2 | 12/2011 | Sauder et al. |
| 8,365,697 | B2 | 2/2013 | Cleeves |
| 8,418,636 | B2 | 4/2013 | Liu et al. |
| 8,909,436 | B2 | 12/2014 | Achen |
| 8,924,092 | B2 | 12/2014 | Achen |
| 8,935,986 | B2 * | 1/2015 | Blomme ................ A01C 5/062 111/164 |
| 9,674,999 | B2 * | 6/2017 | Achen .................. A01B 63/008 |
| 9,686,901 | B2 * | 6/2017 | Achen .................... A01B 49/04 |
| 9,743,578 | B2 * | 8/2017 | Blomme .............. A01B 79/005 |
| 2007/0272134 | A1 | 11/2007 | Baker et al. |
| 2008/0011207 | A1 | 1/2008 | Kryzak |
| 2009/0112475 | A1 | 4/2009 | Christy et al. |
| 2010/0023430 | A1 | 1/2010 | Hunter et al. |
| 2010/0198529 | A1 | 8/2010 | Sauder et al. |
| 2012/0042813 | A1 | 2/2012 | Liu et al. |
| 2012/0046838 | A1 | 2/2012 | Landphair et al. |

OTHER PUBLICATIONS

Kinze Manufacturing, Inc., PCT/US2012/035563, "International Search Report and Written Opinion", 11 pages, dated Jan. 13, 2012.
Kinze Manufacturing, Inc., PCT/US2012/035518, "International Search Report and Written Opinion", 9 pages, dated Jan. 13, 2012.
Kranner et al., "Noninvasive Diagnosis of Seed Viability Using Infrared Thermography", Proceedings of the National Academy of Sciences, vol. 107, No. 8, pp. 3912-3917 dated Feb. 23, 2010.

* cited by examiner

DOWN AND/OR UP FORCE ADJUSTMENT SYSTEM

CROSS-REFERENCE TO RELATED APPLICATIONS

This application is a Continuation Application of U.S. Ser. No. 14/547,651, filed Nov. 19, 2014, which is a continuation of 13/457,815 filed Apr. 27, 2012, now U.S. Pat. No. 8,924,092, issued Dec. 30, 2014, which claims priority under 35 U.S.C. § 119 to U.S. Provisional Patent Application Nos. 61/479,540, filed Apr. 27, 2011, 61/479,537, filed Apr. 27, 2011, and 61/479,543, filed Apr. 27, 2011, all of which are incorporated by reference in their entirety.

FIELD OF THE INVENTION

This invention relates generally to agricultural devices and, more particularly, to down force adjustment of a row unit of an agricultural device.

BACKGROUND

Implements for planting row crops, such as corn and soybeans, (planters) typically include row units laterally spaced along a frame, or toolbar. The row units generally include a seed channel opener that creates a channel or furrow in the soil for seed placement. Each row unit is mounted to the toolbar by means of a four-bar linkage or its equivalent which allows each row unit to move vertically to adjust to the contour of the soil independently of the other row units on the same toolbar. Some planters have springs in the four-bar linkage which work to transfer weight from the planter's frame to the row unit creating down force to help the seed channel opener penetrate the soil and to minimize row unit bounce in rough soil conditions. Insufficient down force can result in a seed furrow of inadequate depth or a seed furrow simply not formed, which in turn results in shallow seed placement or seed placement on the soil surface. However, too much down force could overly compact the seed bed or form the seed furrow too deep, which could negatively affect early plant development. Furthermore, excessive down force could accelerate wear on the row units' soil-engaging components. The springs can be adjusted to adjust the down force of the row unit. This adjustment usually is made by manually changing the position of the springs in the four-bar linkage.

In other planters, airbags are employed in the four-bar linkage which are similarly adapted to transfer weight from the planter's frame to the row unit creating down force to help the seed channel opener penetrate the soil and to minimize row unit bounce. In both of these conventional biasing means—springs and airbags—the system lacks accuracy and predictability. For instance, when the biasing means is an airbag, it can be difficult to precisely determine the volume of air in the airbag at a given time and, subsequently, determine needed supplemental down force.

It is desirable to be able to adjust down force on a row unit quickly and accurately so that a consistent seed depth is maintained. It is also desirable to be able to lift the row unit if its own weight is applying too much down force to the soil.

SUMMARY

Accordingly, it is an object of the present invention to provide for a quick and accurate adjustment of the down force on a row unit during planting.

It is another object of the present invention to provide the capability to put both positive and negative pressure on the row unit.

These and other objects are achieved by the present invention. In some exemplary aspects of the present invention, a row unit of a planter is provided. The row unit is mounted to a toolbar of a planter by means of a four-bar linkage having a set of top and bottom parallel arms. At least one spring is provided between the top and bottom arms and connected at one end to the bottom arm in a fixed manner at a connection point. The other end of the spring is connected to a spring mount that is disposed on the top arm and coupled to an electric actuator. The spring mount is longitudinally movable in both directions of the top arm. The electric actuator moves the spring mount forward and backward along the top arm, which adjusts the down or up force placed on the row unit, which in turn can increase or decrease the soil penetration of a seed channel opener component of the row unit, and keep the row unit from bouncing in rough soil conditions.

In other exemplary aspects, an agricultural device is provided and includes a toolbar, a row unit, a linkage coupling the row unit to the toolbar, wherein the linkage includes a first arm and a second arm, and wherein each of the first arm and the second arm includes a first end coupled to the toolbar and a second end coupled to the row unit, an actuator coupled to the toolbar, and a biasing member coupled to the linkage and the actuator, wherein the actuator is adapted to move the biasing member to vary an amount of force applied to the row unit.

In further exemplary aspects, a row unit adjustment system for use in an agricultural planter for planting seeds is provided. The agricultural planter includes a toolbar and a row unit coupled to the toolbar by a linkage. The row unit adjustment system includes an actuator including an adjustment member, a biasing member coupled to the linkage and the adjustment member, a sensor adapted to sense a characteristic associated with planting seeds and generate a signal associated with the sensed characteristic, and a processing unit receiving the signal associated with the sensed characteristic and determining whether adjustment of the biasing member is necessary based on the signal.

In still other exemplary aspects, a method for adjusting a force applied to a row unit of an agricultural planter is provided. The agricultural planter includes a toolbar and the row unit includes a linkage coupling the row unit to the agricultural planter. The method includes providing an actuator including an adjustment member, coupling a biasing member at a first end to the linkage and at a second end to the adjustment member, sensing a characteristic associated with planting with a sensor, generating a signal associated with the characteristic with the sensor, communicating the signal to a processing unit, and adjusting a position of the biasing member with the actuator based on the signal received by the processing unit in order to adjust a force applied to the row unit.

BRIEF DESCRIPTION OF THE DRAWINGS

The appended claims set forth those novel features which characterize the invention. However, the invention itself, as well as further objects and advantages thereof, will best be understood by reference to the following detailed description of an exemplary embodiment, taken in conjunction with the accompanying drawings, where like reference characters identify the elements throughout the various figures in which:

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

DETAILED DESCRIPTION

The contents of U.S. patent application Ser. No. 13/458,012, filed Apr. 27, 2012, entitled "AGRICULTURAL DEVICES, SYSTEMS, AND METHODS FOR DETERMINING SOIL AND SEED CHARACTERISTICS AND ANALYZING THE SAME", and U.S. patent application Ser. No. 13/457,577, filed Apr. 27, 2012, entitled "REMOTE ADJUSTMENT OF A ROW UNIT OF AN AGRICULTURAL DEVICE", are both incorporated herein by reference.

Figure 1:
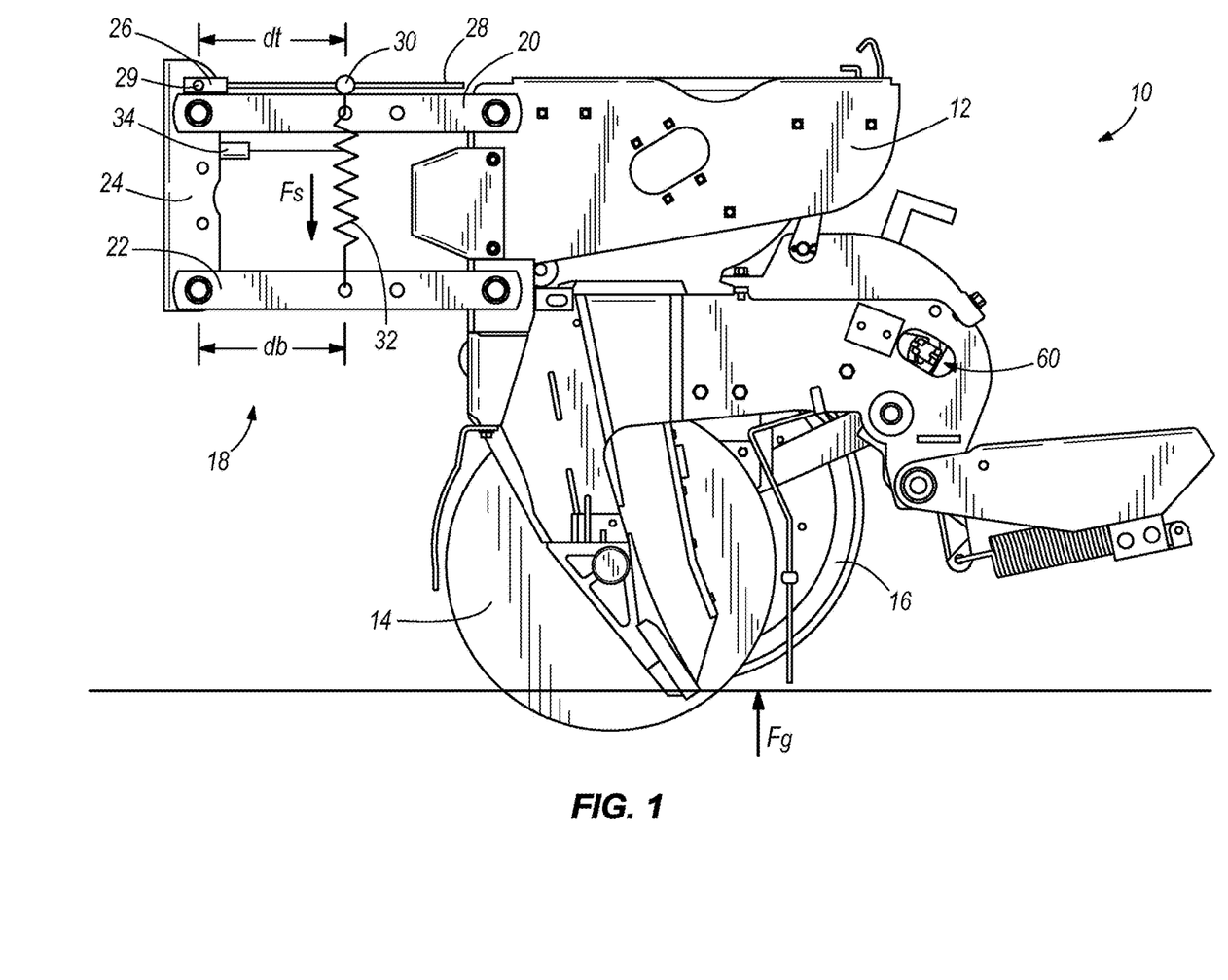
FIG. 1 is a side elevation view of a portion of an exemplary planter row unit, the exemplary row unit including an exemplary down force adjustment system.
Figure 2:
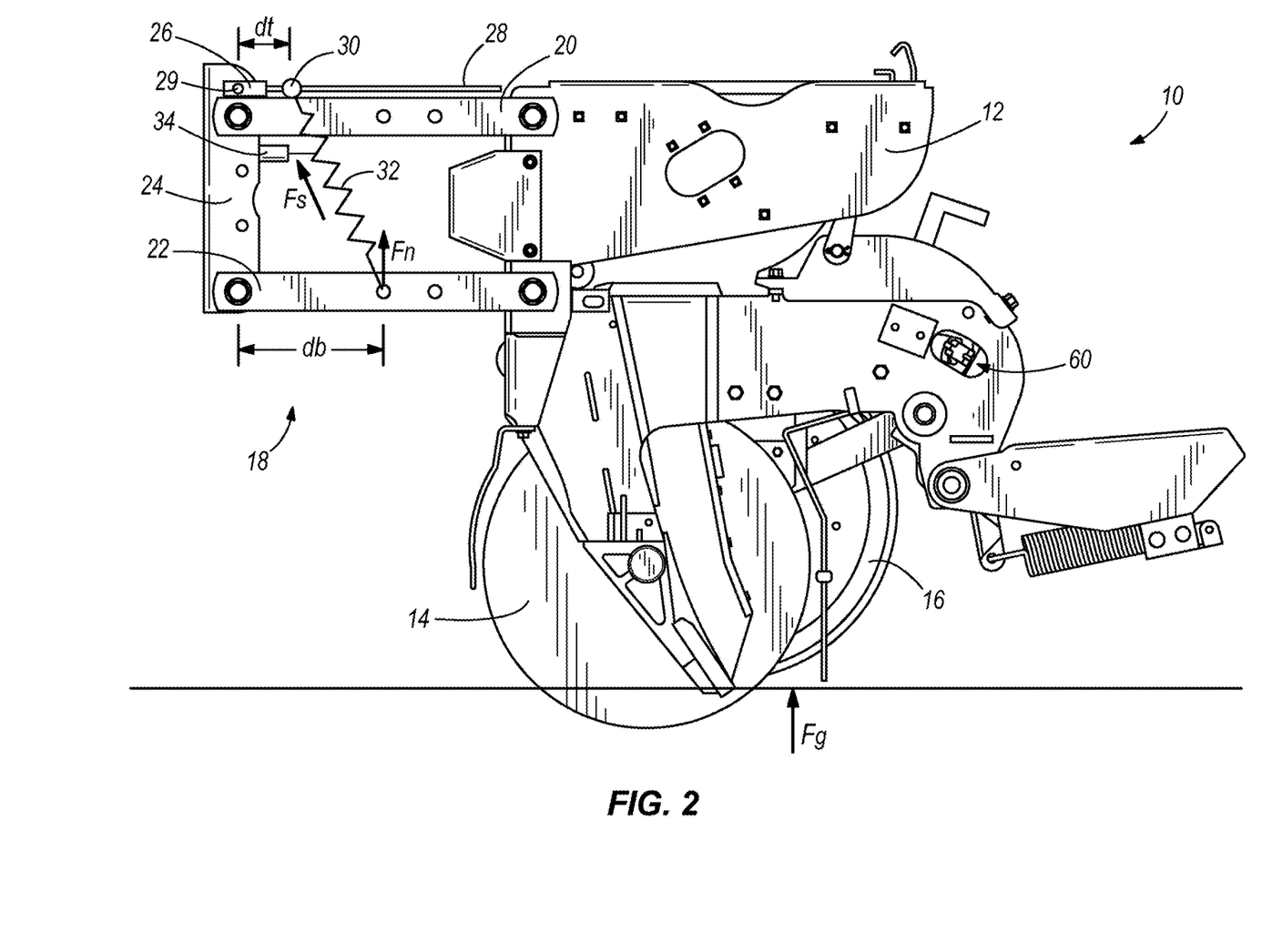
FIG. 2 is a side elevation view similar to FIG. 1 showing a down force spring of an exemplary down force adjustment system adjusted to provide a negative down force on the row unit.
Figure 3:
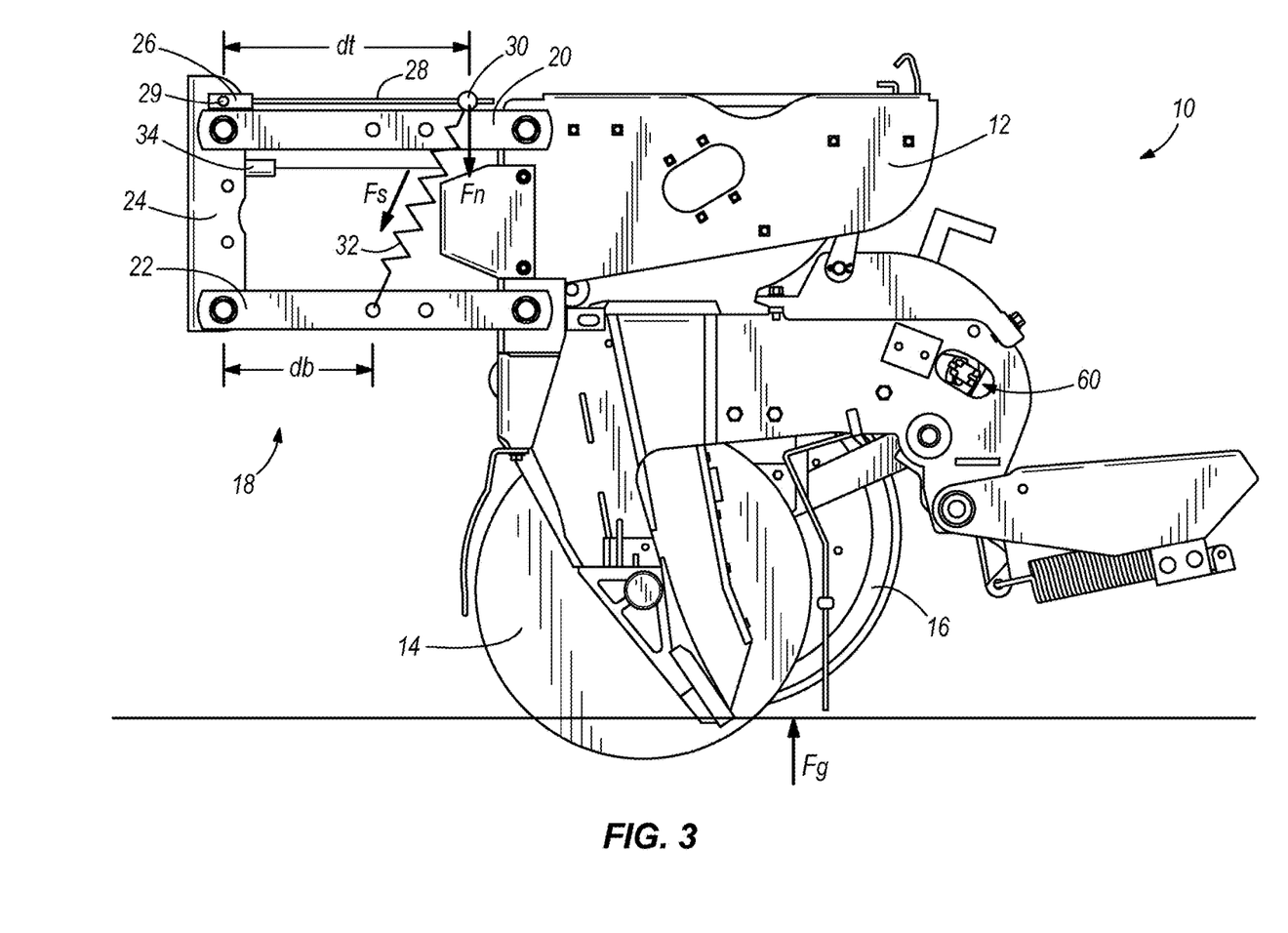
FIG. 3 is a side elevation view similar to FIGS. 1 and 2 showing a down force spring of an exemplary down force adjustment system adjusted to provide a positive down force on the row unit.

Referring to FIG. 1, there is shown a side elevation view of an exemplary planter row unit 10 in accordance with the principles of the present invention. A single row unit 10 is depicted in the figures and described herein for simplicity, but it is understood that a typical planter 36 (see FIG. 4) includes multiple row units 10. Row unit 10 includes a frame 12. Mounted to the lower section of frame 12 are a pair of furrow-opening discs 14 (one of which is seen in FIGS. 1-3), a pair of depth gauge wheels 16 (one of which is seen in FIGS. 1-3) and a pair of furrow closing wheels (not shown). As is known, seed is stored in a hopper (not shown), fed to and "singulated" by a meter (not shown) and deposited at desired spacing in the furrow formed by the furrow-opening discs 14. The furrow is then closed and soil is packed about the seed by the closing wheels.

The row unit 10 is mounted to a toolbar (not shown) by a conventional four-bar linkage 18. Four-bar linkage 18 includes parallel top arms 20 (one of which is seen in FIGS. 1-3) and parallel bottom arms 22 (one of which is seen in FIGS. 1-3) on each side of the row unit 10. The forward ends of the top arms 20 are pivotally connected to an upper portion of a mounting plate 24. Likewise, the forward ends of the bottom arms 22 are pivotally connected to a lower portion of the mounting plate 24. Mounting plate 24 is in turn coupled to the toolbar. A conventional mounting arrangement for attaching the mounting plate 24 to the toolbar would typically include threaded U-shaped bolts and mounting nuts which are not shown in the drawing for simplicity. The rear ends of top and bottom arms 20 and 22 are pivotally connected to row unit frame 12.

The top and bottom arms 20 and 22 are connected to both the mounting plate 24 and row unit frame 12 by means of a nut and bolt combination which allows the top and bottom arms 20 and 22 to pivot at both ends. The four-bar linkage 18 permits the row unit 10 to move vertically, independently of adjacent row units, while remaining laterally in place on the toolbar.

At least one linear actuator 26 is mounted to the mounting plate 24 above a top arm 20 of the linkage 18. In other exemplary embodiments, a linear actuator 26 may be provided above each top arm 20 of the linkage 18. Linear actuator 26 can be of an electric, hydraulic or air type, having a shaft 28 that extends longitudinally parallel to the top arm 20. A mounting bracket 30 is provided on top arm 20 and coupled to the shaft 28. The mounting bracket 30 engages and is supported by a top surface of top arm 20 and may slide, roll, or otherwise move along the top surface of the top arm 20. During up and down movement of the row unit 10, shaft 28 pivots about pin or pivot 29 to maintain the shaft 28 substantially parallel to the top arm 20. At least one biasing member 32 under tension is provided between top and bottom arms 20, 22. In the illustrated exemplary embodiment, the biasing member 32 is a spring or coil spring. However, it should be understood that the biasing member 32 may be any type of biasing member and other types of springs and still be within the intended spirit and scope of the present invention. In exemplary embodiments including an actuator 26 above each top arm 20, two tension springs 32 may be included in the linkage 18 with one spring 32 coupled to each actuator 26. In other exemplary embodiments, one actuator 26 and two springs 32 may be included in the linkage 18 with one spring 32 coupled to the actuator 26 and the second spring 32 coupled to and between the top and bottom arms 20, 22. In the illustrated exemplary embodiment, the spring 32 is connected at a lower end to the bottom arm 22 at a fixed point and at an upper end to the mounting bracket 30 on the top arm 20. The tension applied across the tension spring 20 may be varied to adjust the tension on spring 32 and thus the amount of weight transferred from the toolbar to the row unit 10 by extending or retracting the shaft 28 of the actuator 26, which in turn will move the mounting bracket 30 forward or rearward along the top arm 20. Alternatively, the actuator 26 may be a screw-drive type actuator 26, and the shaft 28 and the mounting bracket 30 may have a screw or threaded engagement between the two components, thereby causing the mounting bracket to translate along the shaft 28 as the shaft 28 rotates. The shaft 28 may rotate either direction to enable the mounting bracket 30 to translate in either direction.

With continued reference to FIG. 1, dt denotes the distance between the proximal pivot point of the top arm 20 and the mounting bracket 30, which is the connection point of the upper end of the spring 32, and db denotes the distance between the proximal pivot point of the bottom arm 22 and the fixed connection point of the lower end of the spring 32. As shown in FIG. 1, when dt and db are the same, the spring 32 is in a neutral position where the net effect on the force applied to the soil Fg is zero. As shown in FIG. 2, when the actuator 26 retracts the shaft 28, the mounting bracket 30 is moved to a position closer to the proximal pivot point of top arm 20. In this position the spring 32 is in a negative, or up force position in which dt is less than db, and where a net negative force will be put on the row unit 10 which decreases the force applied to the soil by the furrow-opening discs 14.

As shown in FIG. 3, when the actuator 26 extends the shaft 28, the mounting bracket 30 is moved to a position further from the proximal pivot point of top arm 20. In this position, the spring 32 is in a positive, or down force position in which dt is greater than db, and where a net positive force will be applied to the row unit 10. This increases the force that is applied to the soil by the furrow-opening discs 14.

With continued reference to FIGS. 1-3, an exemplary sensor 34 is provided to sense or determine a position of the biasing member 32. In the illustrated exemplary embodiment, the sensor 34 is coupled to the mounting plate 24. In other exemplary embodiments, the sensor 34 may be coupled to any portion of the toolbar, linkage 18, row unit 10, etc. and still be within the intended spirit and scope of the present invention. The sensor 34 may be any type of sensor for determining a position of the biasing member 32. For example, the sensor 34 may be an ultrasonic sensor, a laser sensor, a potentiometer, a hall effect sensor, or any other type of sensor. In other exemplary embodiments, the sensor 34 may be coupled to or included within the actuator 26 and may be a wide variety of types of sensors such as, for example, a potentiometer, a hall effect sensor, etc.

The actuator 26 is controlled by conventional means via a user interface 40, which can be in the cab of a tractor 38 that pulls the planter 36 and row units 10 through a field. In this way, a farmer can adjust down force on the row unit 10 quickly and accurately so that furrow-opening discs 14 can maintain a consistent furrow depth, or the farmer can lift the row unit 10 if its own weight is applying too much down force to the soil.

Figure 4:
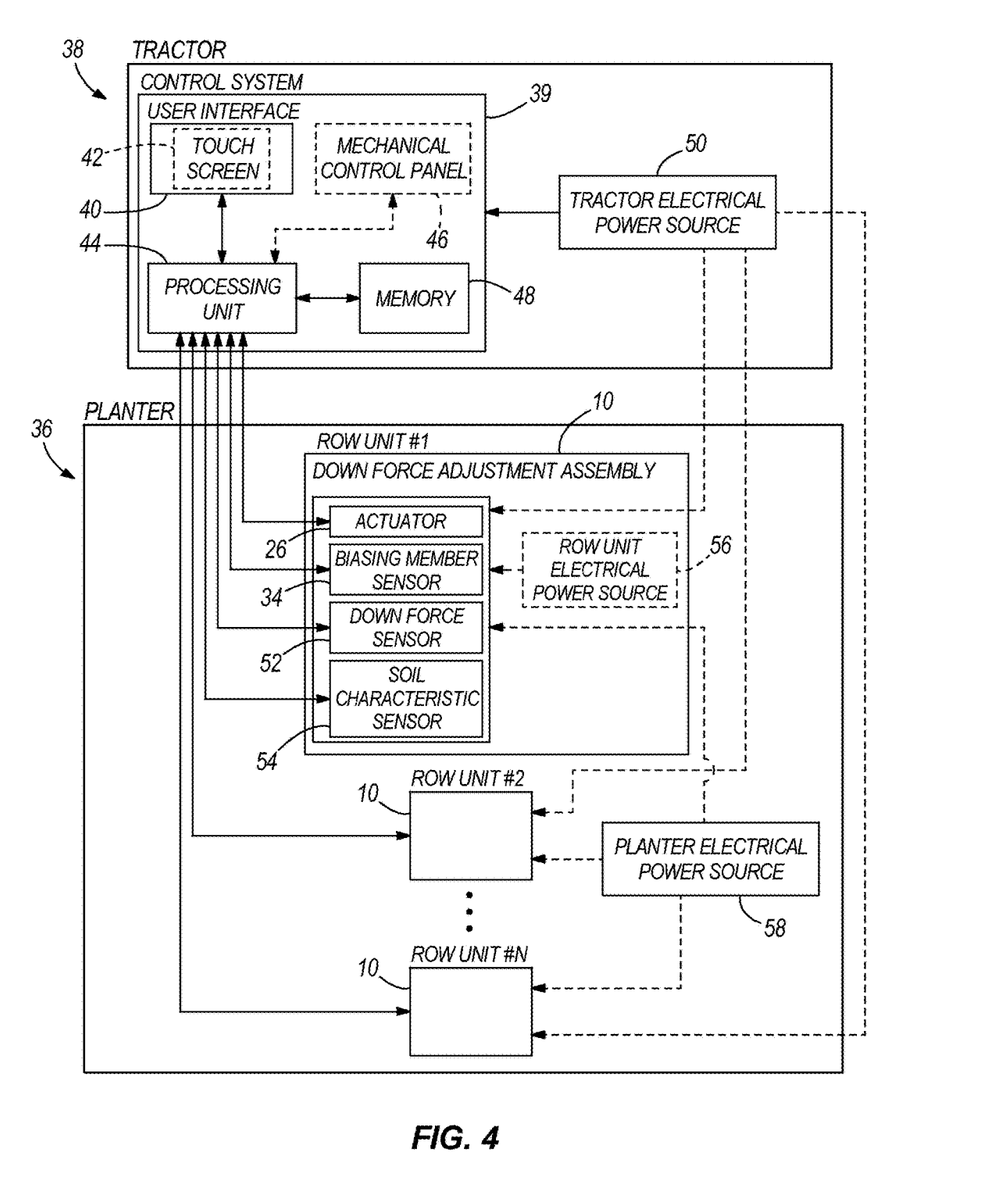
FIG. 4 is an exemplary system diagram of the present invention.

Referring now to FIG. 4, an exemplary system of the present invention is illustrated and includes a tractor 38 and a planter 36. The tractor 38 includes a control system 39 including a user interface 40 with an optional touch screen 42 and associated touch screen capabilities, a processing unit 44, an optional mechanical control panel 46, and a memory 48. The tractor 38 also includes a tractor electrical power source 50. The planter 36 includes multiple row units 10, however, since the row units 10 are substantially identical, only one row unit 10 is illustrated with further detail and described herein. Each row unit 10 includes a down force adjustment assembly including the actuator 26, the biasing member position sensor 34, a down force sensor 52, and a soil characteristic sensor 54 (see FIGS. 4 and 5). Each row unit 10 may include an optional row unit electrical power source 56 and the planter 36 further includes a planter electrical power source 58. In other exemplary embodiments, the planter 36 may include a processing unit and/or the row units 10 may each include a processing unit and the processing unit(s) of the planter 36 and/or the row units 10 may communicate with the processing unit 44 of the tractor 38 via a communication bus.

The down force sensor 52 may be, for example, a force transducer that is coupled to a depth-adjusting lever mechanism 60 (see FIG. 5) or the gauge wheels 16 for monitoring and/or measuring a down force occurring in the depth-adjusting mechanism 60 or the gauge wheels 16 and applied to the row unit 10 to force the row unit 10 downward toward the soil. The down force sensor 52 may be any type of sensor such as, for example, a load cell, a pressure sensor, a potentiometer, etc., and may be coupled to any portion of the row unit 10 as long as it can operate appropriately to sense a down force. Such a force sensor 52 may be electronically coupled to the processing unit 44 to enable the processing unit 44 to take readings of the down force and display related information to a user via the user interface 40 or to enable the processing unit 44 to communicate with the necessary components to adjust the down force.

Figure 5:
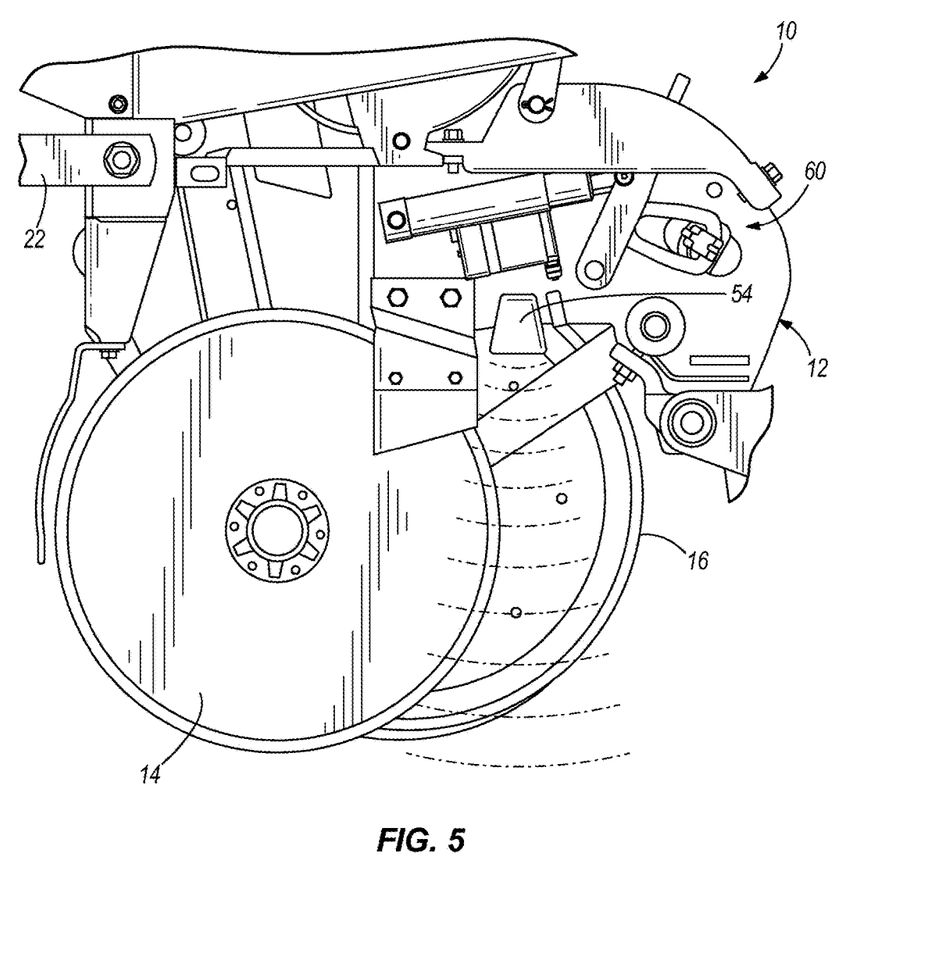
FIG. 5 is a side elevation view of a portion of an exemplary planter row unit including an exemplary soil characteristic sensor.

With further reference to FIG. 5, an exemplary soil characteristic sensor 54 is illustrated and may be coupled to the row unit 10 in any manner and at any location as long as the sensor 54 can sense desired soil characteristic(s). The soil characteristic sensor 54 may sense any soil characteristic and operate in any of the manners described in U.S. Provisional Patent Application Nos. 61/479,537 and 61/479,543, both of which were filed Apr. 27, 2011 and both of which are incorporated herein by reference.

All of the sensors may generate a signal associated with the characteristic they are sensing and communicate with the processing unit so the processing unit may receive the signals, interpret the signals, and react accordingly to perform the desired functions of the system.

It should be understood that the sensors described and illustrated herein may be any type of sensor and be within the intended spirit and scope of the present invention. Exemplary sensors include, but are not limited to, ultrasonic sensors, laser sensors, video cameras, infra-red sensors, infra-red cameras, infra-red scanners, microwave sensors, potentiometers, hall effect sensors, force transducers, etc.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

While particular embodiments of the present invention have been illustrated and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matters set forth in the foregoing description and accompanying drawings is offered by way of illustration only and not as a limitation. The actual scope of the invention is intended to be defined in the following claims when viewed in their proper perspective based on the prior art.

What is claimed is:

1. An agricultural device comprising:
   a toolbar;
   a row unit;
   a linkage coupling the row unit to the toolbar, wherein the linkage includes a first arm and a second arm, and wherein each of the first arm and the second arm includes a first end coupled to the toolbar and a second end coupled to the row unit;
   an actuator coupled to the toolbar;
   a biasing member coupled to the linkage and the actuator, wherein the actuator is adapted to adjust the biasing member to vary an amount of force applied to the row unit; and
   a first sensor adapted to sense a characteristic of the biasing member.

2. The agricultural device of claim 1, further comprising an adjustment system for determining the force applied to the row unit and a characteristic of an at least a portion of soil upon which the row unit travels.

3. The agricultural device of claim 2, wherein the adjustment system comprises a second sensor adapted to sense a force applied to the row unit, and a third sensor adapted to sense a characteristic of a soil upon which the row unit travels.

4. The agricultural device of claim 3, wherein the first sensor generates a signal associated with the characteristic of the biasing member.

5. The agricultural device of claim 4, further comprising a processing unit in communication with the sensors to receive the signals and determine whether adjustment of the biasing member is necessary based on the signals.

6. The agricultural device of claim 5, further comprising a user interface in communication with the processing unit, and wherein any necessary adjustment required is communicated to the user interface by the processing unit and is displayed on the user interface.

7. The agricultural device of claim 5, wherein the processing unit communicates with the actuator to automatically adjust the biasing member based on the signal.

8. The agricultural device of claim 3, wherein the second sensor adapted to sense a force applied to the row unit comprises a load cell, a pressure sensor, a potentiometer, or some combination thereof.

9. The agricultural device of claim 8, wherein the third sensor generates a signal associated with the characteristic of the soil, and the agricultural device further comprising a processing unit in communication with the second sensor to receive the signal and determine whether adjustment of the biasing member is necessary based on the signal.

10. The agricultural device of claim 9, wherein the characteristic of the soil is one of soil temperature, moisture content of soil, depth of a furrow, and soil type.

11. A method of adjusting a force applied to a row unit of an agricultural planter, the agricultural planter including a toolbar and the row unit including a linkage coupling the row unit to the agricultural planter, the method comprising:
provi­ding an actuator;
coupling a biasing member to the linkage and to the actuator;
sensing a plurality of characteristics associated with planting with at least one sensor, said characteristics including at least one characteristics associated with a portion of soil upon which the row unit travels;
generating a signal associated with the characteristics sensed by the at least one sensor;
communicating the signal to a processing unit; and
adjusting the biasing member with the actuator based on the signal received by the processing unit in order to adjust an up or down force applied to the row unit.

12. The method of claim 11, further comprising displaying information associated with the signal on a user interface.

13. The method of claim 12, wherein the step of adjusting the biasing member with the actuator occurs automatically based upon predetermined values.

14. The method of claim 12, wherein the step of adjusting the biasing member further includes manually adjusting the biasing member after reviewing information associated with the signal on the user interface.

15. The method of claim 12, wherein the step of sensing a plurality of characteristics associated with planting includes the use of a plurality of sensors.

16. The method of claim 15, wherein sensing a plurality of characteristics includes sensing multiple of a position of the biasing member, a characteristic of a soil upon which the agricultural planter travels, and a force applied to the row unit.

17. A row unit adjustment system for use with an agricultural planter for planting seeds, the agricultural planter including a toolbar and at least one row unit coupled to the toolbar, the row unit adjustment system comprising:
an actuator operatively connected to the row unit;
a biasing member operatively connected to the linkage and the actuator; and
a plurality of sensors each adapted to sense a separate characteristic associated with planting seeds and to generate a signal associated with each of the sensed characteristics;
wherein the actuator is adapted to adjust the biasing member to vary an amount of force applied to the at least one row unit.

18. The row unit adjustment system of claim 17, further comprising a processing unit receiving the signals associated with the sensed characteristics and determining whether adjustment of the biasing member is necessary based on the signals.

19. The row unit adjustment system of claim 17, wherein a first characteristic is a characteristic of the biasing member and the signal is associated with the characteristic of the biasing member.

20. The row unit adjustment system of claim 19, wherein a second characteristic associated with planting seeds is one of soil temperature, moisture content of soil, depth of a furrow, and soil type.

* * * * *